US006697988B2

United States Patent
Kim et al.

(10) Patent No.: US 6,697,988 B2
(45) Date of Patent: Feb. 24, 2004

(54) DATA TRANSMISSION APPARATUS AND METHOD FOR AN HARQ DATA COMMUNICATION SYSTEM

(75) Inventors: Min-Koo Kim, Suwon-shi (KR); Beong-Jo Kim, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 392 days.

(21) Appl. No.: 09/864,988

(22) Filed: May 24, 2001

(65) Prior Publication Data

US 2002/0004924 A1 Jan. 10, 2002

(30) Foreign Application Priority Data

May 24, 2000 (KR) .......................................... 2000-29121

(51) Int. Cl.[7] .............................................. H03M 13/00
(52) U.S. Cl. ........................ 714/752; 714/748; 714/751
(58) Field of Search ................................ 714/746, 774, 714/790, 752, 751, 776, 748; 375/259

(56) References Cited

U.S. PATENT DOCUMENTS

| 5,566,189 | A | * | 10/1996 | Laskowski ................... 714/746 |
| 5,828,677 | A | * | 10/1998 | Sayeed et al. ............... 714/774 |
| 6,014,411 | A | * | 1/2000 | Wang ........................... 375/259 |
| 6,385,752 | B1 | * | 5/2002 | Li ................................ 714/790 |
| 6,421,803 | B1 | * | 7/2002 | Persson et al. ............. 714/752 |
| 6,519,731 | B1 | * | 2/2003 | Huang et al. ................ 714/751 |

* cited by examiner

*Primary Examiner*—David Ton
(74) *Attorney, Agent, or Firm*—Dilworth & Barrese, LLP

(57) ABSTRACT

An apparatus provided with a plurality of transport channels, transmits a data block and a control message having control bits required in decoding data bits. A first rate matching part provided in a selected one of the transport channels, passing the data block, punctures a predetermined number of data bits from the data bits within the data block. A second rate matching part provided in another transport channel, repeats the control bits as many as the predetermined number of punctured bits.

14 Claims, 6 Drawing Sheets

DATA TRANSMISSION APPARATUS AND METHOD FOR AN HARQ DATA COMMUNICATION SYSTEM

PRIORITY

This application claims priority to an application entitled "Data Transmission Apparatus and Method for an HARQ Data Communication System" filed in the Korean Industrial Property Office on May 24, 2000 and assigned Ser. No. 2000-29121, the contents of which are hereby incorporated by reference.

BACKGROUND OF THE INVENTION

1. Field of the Invention

The present invention relates generally to a data transmission apparatus and method in a radio communication system, and in particular, to an apparatus and method for managing retransmission of data which is subjected to transmission error during data transmission.

2. Description of the Related Art

A radio communication system chiefly uses convolutional codes, turbo codes or linear block codes, for channel coding. Such a radio communication system may employ an HARQ (Hybrid Automatic Repeat Request) Type I using an ARQ (Automatic Repeat Request) scheme which requests retransmission of data packets upon completion of decoding and CRC error check. HARQ scheme is generally applicable to a satellite system, an ISDN (Integrated Services Digital Network) system, a digital cellular system, a CDMA-2000 (Code Division Multiple Access-2000) system, a UMTS (Universal Mobile Telecommunication System) system or an IMT-2000 (International Mobile Telecommunication-2000) system, and HARQ scheme includes the convolutional codes and the turbo codes.

The above-stated hybrid ARQ scheme is generally divided into HARQ Type I, HARQ Type II and HARQ Type III. At present, most of the multi-access schemes and the multi-channel schemes using the convolutional codes or the turbo codes employ the HARQ Type I. That is, the multi-access and multi-channel schemes of the radio communication system using the above-stated channel coding scheme, employ the HARQ Type I as an ARQ scheme for increasing the data transmission efficiency, i.e., throughput of the channel coding scheme and improving the system performance.

A principle of the HARQ Type I is based on the fact that the channel encoder using the convolutional code, the turbo code or the linear block code has a constant code rate. FIGS. 1A and 1B illustrate a conceptional data process flow by the HARQ Type I.

Commonly, a transmitter of the radio communication system combines L-bits transmission data with a CRC (Cyclic Redundancy Check) code for error detection and then encodes the combined data, L+CRC, through channel coding. The transmitter transmits the encoded data through an assigned channel. Meanwhile, a receiver of the radio communication system acquires the original L-bits data and the CRC code through a reverse operation of the transmitter, and transmits a response signal ACK/NAK to the transmitter according to the CRC check results.

This will be described in more detail with reference to FIG. 1A. A CRC encoder 110 receives an L-bits source data packet and encodes the received data using a CRC code, creating a FEC input data block, L+CRC. Commonly, CRC bits are added to the source data before channel encoding. A channel encoder 112 performs channel coding on the FEC input data block, L+CRC, creating a channel-coded data block, $(L+CRC) \times R^{-1}$. The channel-coded data block, $(L+CRC) \times R^{-1}$, is provided to a specific channel through other functional blocks 114 necessary for multiplexing.

Other inverse functional blocks 124 necessary for demultiplexing in the receiver receiving the channel-coded data block through the specific channel, demultiplex the received coded data block and output a channel-coded data block, $(L+CRC) \times R^{-1}$. A channel decoder 122 then performs channel decoding on the channel-coded data block, $(L+CRC) \times R^{-1}$, and outputs a channel-decoded data block, L+CRC. A CRC decoder 120 performs CRC decoding on the channel-decoded data block, L+CRC, to acquire the original data, i.e., the L-bits source data packet. After completion of CRC decoding, the CRC decoder 120 performs CRC checking using the CRC decoding results, thereby to determine whether the source data packet has transmission errors.

If no error is detected through the CRC check, the receiver provides the source data packet to an upper layer and transmits a confirm signal ACK (Acknowledgement) acknowledging the source data packet to the transmitter. However, upon detecting an error through the CRC check, the receiver transmits a confirm signal NAK (Not-Acknowledgement) requesting retransmission of the channel coded data packet to the transmitter.

After transmitting the channel-coded data block, the transmitter receives the confirm signal ACK/NAK from the receiver in response to the transmitted channel-coded data block. Upon receipt of the confirm signal NAK, the transmitter retransmits the corresponding channel-coded data block in the above-described operation. The transmission scheme includes Stop-and-Wait ARQ, Go-Back-N ARQ, and Selective-Repeat ARQ schemes. The detailed description of the retransmission schemes will be omitted.

FIG. 1B illustrates a conceptual transmission procedure of the channel-coded data packet between the transmitter and the receiver. FIG. 1B shows that the transmitter retransmits the channel-coded data block upon every receipt of m NAKs from the receiver.

As an example of such a procedure, in an air interface of the 3GPP-2 ($3^{rd}$ Generation Partnership Project-2; a standard for a synchronous CDMA system) mobile communication system (hereinafter, referred to as "CDMA-2000" system), the multi-access scheme and the multi-channel scheme of the system employ the HARQ Type I in order to increase data transmission efficiency of the channel coding scheme and to improve the system performance. In addition, in an air interface of the 3GPP ($3^{rd}$ Generation Partnership Project; a standard for an asynchronous CDMA system) mobile communication system (hereinafter, referred to as "UMTS system"), the multi-access scheme and the multi-channel scheme of the system also employ the HARQ Type I in order to increase data transmission efficiency of the channel coding scheme and to improve the system performance.

However, the HARQ Type I has the following disadvantages.

First, the HARQ Type I has higher throughput, compared with a pure ARQ scheme. However, as a signal-to-noise ratio (S/N) of a signal is increased more and more, the throughput becomes saturated to a code rate R of the FEC code, thus resulting in a reduction in the throughput as compared with the pure ARQ. That is, the throughput cannot approach 1.0 (100%) even at very high S/N. Such a problem is shown by a characteristic curve of the HARQ Type I in FIG. 2. That is, as for the HARQ Type I, the throughput is saturated to the code rate R (<1.0) as shown in FIG. 2, so that it cannot approach 1.0.

Second, the HARQ Type I improves the throughput by performing error correction using the FEC code, compared with the pure ARQ. However, since the HARQ Type I uses a constant redundancy, i.e., constant code rate regardless of variation in S/N, it has low transmission efficiency. Therefore, the HARQ Type I cannot adaptively cope with variations in the channel condition, thus causing limitation of throughput.

To solve such problems, the HARQ Type II or the HARQ Type III is used. The HARQ Type II and the HARQ Type III have an adaptive structure which adaptively determines an amount of redundancies used for the FEC code according to how good the channel condition is. Therefore, the HARQ Type II and the HARQ Type III have improved throughput, compared with the HARQ Type I. That is, the adaptive structure reduces the amount of redundancies to a minimum, so that as the S/N of the signal is increased more and more, the code rate R of the FEC code approaches 1, thereby enabling the throughput to approach 1. Meanwhile, the adaptive structure performs optimal error correction such that if the S/N of the signal is decreased, the amount of redundancies is increased to a maximum to enable the code rate R of the FEC code to approach 0, or the redundancies are repeated so as not to enable the throughput to approach 0. Accordingly, the HARQ Type II and the HARQ Type III have improved throughput at both a low S/N and a high S/N.

The HARQ Type I, the HARQ Type II and the HARQ Type III transmit the response signal ACK/NAK, channel condition indication bit, or packet number through a control channel or a through control message channel in response to the received channel-coded data block. In the following description, the channel for transmitting the response signal or control signal message will be referred to as "message channel", and the message transmitted over the message channel will be referred to as "control message."

The message channel can be divided into a forward message channel and a reverse message channel according to the transmitting subject. The HARQ Type I, the HARQ Type II and the HARQ Type III generally use a reverse message channel as a response channel. On the other hand, sort of response message, ACK/NACK, can be transmitted on physical control channel. The reverse message channel is used when the receiver transmits to the transmitter the signal indicating the receiving results of the received data block.

In some cases, however, the HARQ Type I uses the forward message channel according to the ARQ scheme. For example, when using a Selective Repeat ARQ (SR-ARQ) scheme, the HARQ Type I transmits a serial number of every data block transmitted from the transmitter to the receiver over the forward message channel. Meanwhile, the HARQ Type II and the HARQ Type III transmit a redundancy version used during each retransmission in addition to the serial number of the data block generated during each redundancy retransmission to the receiver through the forward message channel.

One of the important factors for guaranteeing performance of the HARQ Type I, the HARQ Type II and the HARQ Type III is reliability of a message channel transmitting the control message.

For example, upon failure to correctly receive the response signal ACK transmitted from the receiver in response to the transmitted data block due to an error of the reverse message channel, the transmitter will continuously retransmit the erroneous data block even though the receiver didn't request retransmission of the data block. Such a problem takes place even in the forward message channel as well as the reverse message channel. That is, upon failure to correctly receive the control message, for example, the data block's serial number and the redundancy type transmitted from the transmitter due to an error of the forward message channel, the receiver will endeavor to decode the erroneous data block retransmitted from the transmitter.

Therefore, in order to solve the above problem, the HARQ scheme is required to use a message channel having higher reliability compared with the channel transmitting the data block. In addition, a response speed of the message channel, i.e., how fast the message channel can transmit the message, is also an important factor in determining performance of the HARQ scheme.

However, to date there has not been proposed a concrete design rule for one case where the multi-access scheme and the multi-channel scheme of the 3GPP-2 CDMA-2000 system including the existing data communication system employ the channel coding scheme (HARQ Type I), and another case where the multi-access scheme and the multi-channel scheme of the 3GPP UMTS system employ the HARQ Type II and the HARQ Type III. That is, since a transmission method and scheme of the message channel in the HARQ Type II and the HARQ Type III used by the existing data systems has been not duly considered, there may occur a performance-related problem. Therefore, in order to optimize performance of the HARQ scheme, it is necessary to realize an HARQ Type II/III message channel satisfying the foregoing description.

In addition, to date there has not been proposed a concrete method for transmitting the message channel for one case where the multi-access scheme and the multi-channel scheme of the CDMA-2000 system including the conventional data communication system employ the channel coding scheme (HARQ Type I), and another case where the multi-access scheme and the multi-channel scheme of the UMTS system employ the HARQ Type II and the HARQ Type III, or a modified HARQ Type I using symbol combining.

SUMMARY OF THE INVENTION

It is, therefore, an object of the present invention to provide an apparatus and method for increasing reliability of a message channel in an HARQ data communication system.

It is another object of the present invention to provide an apparatus and method for increasing reliability of a message channel by assigning bit redundancy of a data block transport channel as a message channel.

It is a further object of the present invention to provide a transmission scheme designed considering the conditions necessary for a message channel most efficient in an HARQ Type II and an HARQ Type III or a modified HARQ Type I using symbol combining.

It is yet another object of the present invention to provide a message channel for a high-speed HARQ scheme, structured to increase its response speed.

It is still another object of the present invention to provide an apparatus and method for transmitting a control message over a message channel in an HARQ data communication system using convolutional codes.

It is still another object of the present invention to provide an apparatus and method for transmitting a control message over a message channel in an HARQ data communication system using turbo codes.

It is still another object of the present invention to provide an apparatus and method for transmitting a control message over a message channel in an HARQ data communication system using linear block codes.

It is still another object of the present invention to provide an apparatus and method for transmitting a control message over a message channel in an HARQ data communication system using convolutional codes, turbo codes and linear block codes.

It is still another object of the present invention to provide an apparatus and method for transmitting a control message over a message channel in a most efficient manner in an HARQ scheme of an asynchronous mobile communication system.

To achieve the above and other objects, there is provided an apparatus provided with a plurality of transport channels, for transmitting a data block having a sequence of data bits and a control message having control bits required in decoding the sequence of data bits. A first rate matching part provided in a selected one of the transport channels, passing the data block, punctures a predetermined number of data bits from the data bits within the data block. A second rate matching part provided in another transport channel, repeats the control bits for as many as the predetermined number of punctured bits.

Preferably, the second transport channel includes the control message arranged at either the head or tail thereof.

Preferably, the control message includes a serial number of a transmission data block, a version number of a given data block and a redundancy type in a given version.

Preferably, the second transport channel has a transmission delay time equal to or less than that of the first transport channel.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1A:
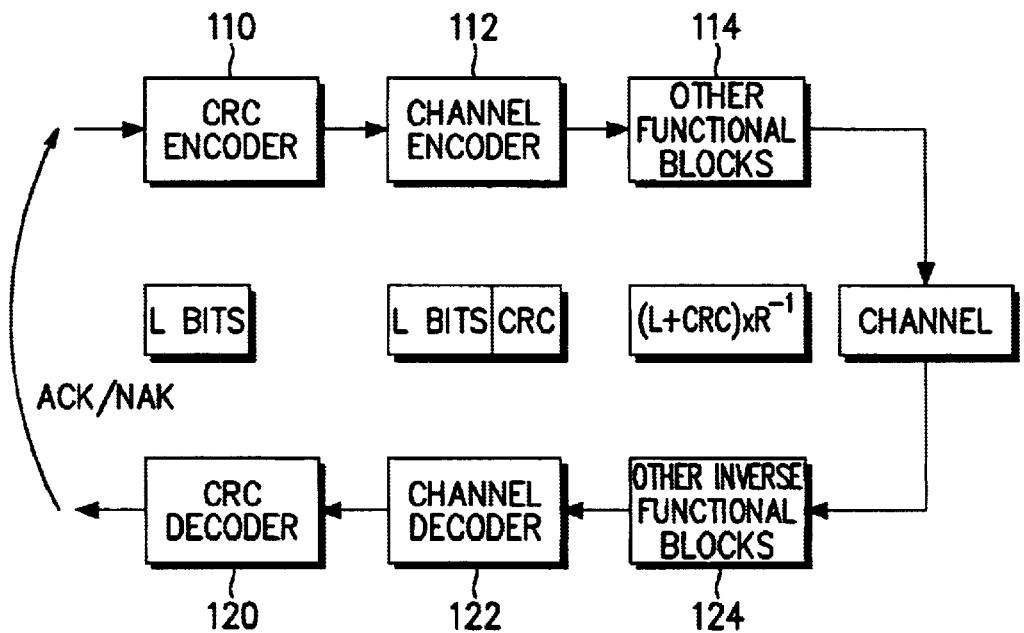
FIG. 1A is a diagram illustrating structures of a transmitter and a receiver for processing data based on a common HARQ Type I.
Figure 1B:
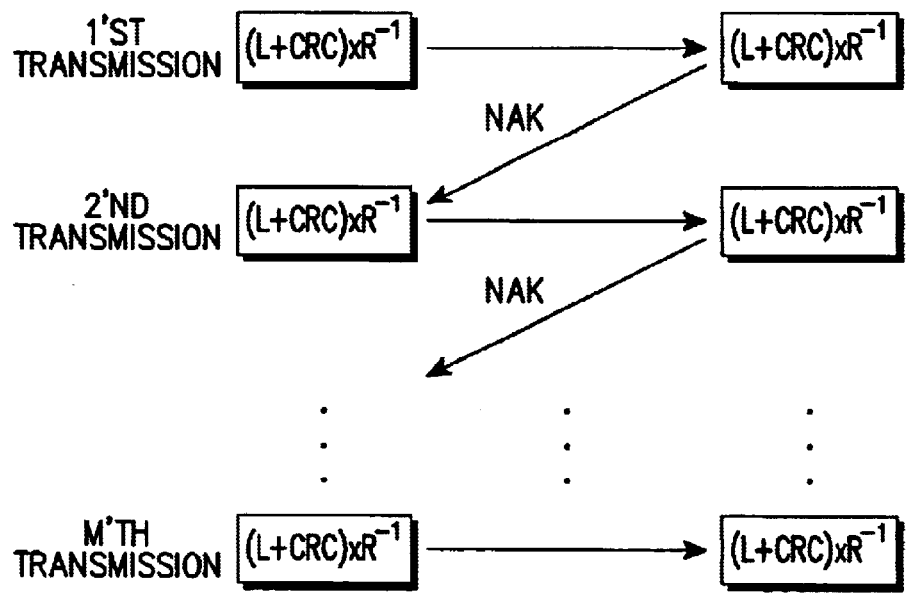
FIG. 1B is a diagram illustrating a conceptual data processing flow based on the common HARQ Type I.
Figure 2:
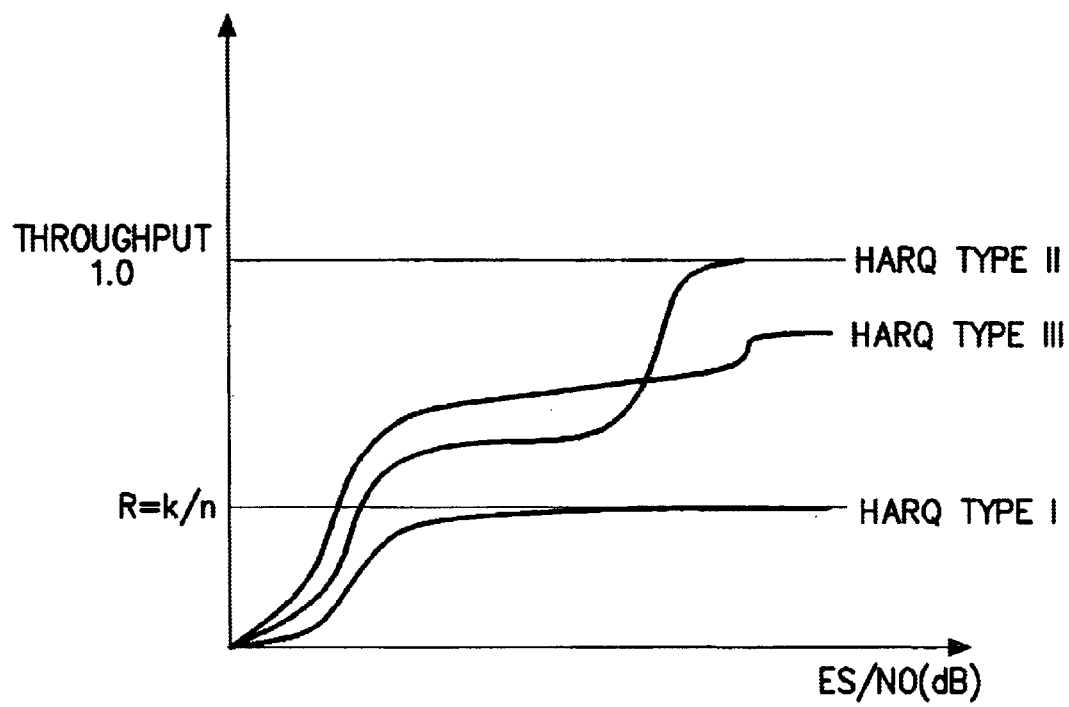
FIG. 2 is a graph illustrating the relationship between S/N (or Es/No) and throughput in common hybrid ARQ types.

A preferred embodiment of the present invention will be described herein below with reference to the accompanying drawings. In the following description, well-known functions or constructions are not described in detail since they would obscure the invention in unnecessary detail.

In the following description, a message transmission method of the HARQ Type I using convolutional codes, turbo codes or linear block codes will first be analyzed to set out its disadvantages. Based on the analysis, a message transport channel transmission method for performance improvement of the HARQ scheme will be described. Next, several embodiments will be provided in which the conditions of the message transport channel are applied to the 3GPP mobile communication system, and then, their advantages and disadvantages will be described.

First, a description of the present invention will be made with reference to a message channel transmission method for the HARQ scheme and an embodiment where the message channel transmission method is applied to the 3GPP standard.

Message Channel Transmission Method for HARQ

Table 1 below shows several methods for transmitting a control message over a dedicated control transport channel (hereinafter, referred to as "dedicated control TrCH" for short).

TABLE 1

|          |                        | Disadvantage                                      | Advantage                                                                                                                                              |
|----------|------------------------|---------------------------------------------------|--------------------------------------------------------------------------------------------------------------------------------------------------------|
| Method 1 | Using DCCH             | TTI Problem occurs. Fast Response Time Required   | Signaling in an upper layer is very simple.                                                                                                            |
| Method 2 | Assigning New TrCH     | Signaling for New TrCH must be Complemented.      | It is very simple to modify physical channel, and effects on physical channel are minimized. That is, it can be implemented with existing rate matching. |
| Method-= 3 | Using Block Coding   | Implementation Complexity Increased.              | It is possible to implement a message channel with high reliability using a powerful coding gain, when TFCI or a new block code is used.                |

Here, the control message to be transmitted requires more powerful protection compared with the existing control data. Therefore, it is preferable to include (or insert) the control message to be transmitted in the head or tail part of the dedicated control TrCH when encoding the dedicated control TrCH, thereby effectively guaranteeing the improved performance to the corresponding part compared with other parts. This is based on the known information that when the coding scheme uses convolutional codes, a trellis starts from a zero state and ends at the zero state.

Figure 3A:
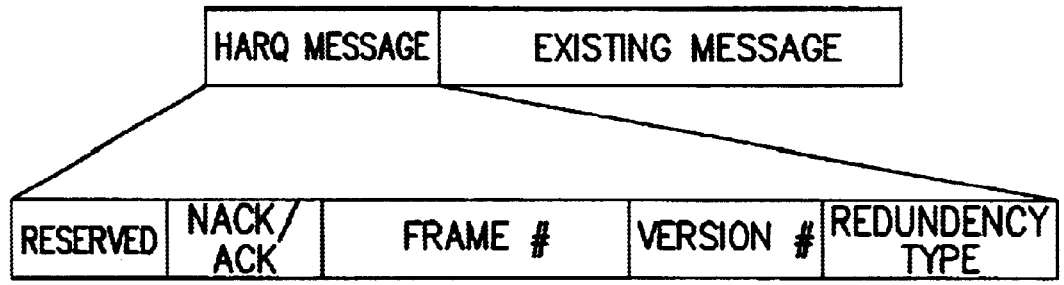
FIG. 3A is a diagram illustrating structures of a transport channel TrCH and its message field according to an embodiment of the present invention.
Figure 3B:
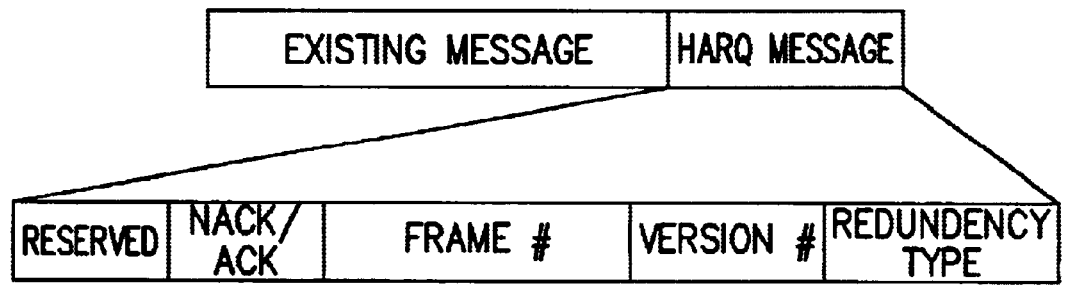
FIG. 3B is a diagram illustrating structures of a transport channel TrCH and its message field according to another embodiment of the present invention.

FIGS. 3A and 3B illustrate example structures of a dedicated control TrCH and its message field, for transmitting an HARQ control message according to two different embodiments of the present invention. Some of fields in the HARQ message can be transmitted on a physical control channel.

As illustrated in FIGS. 3A and 3B, the HARQ message field includes a NACK/ACK field indicating a retransmission response, a Frame_# field indicating a serial number of a transmission data block, a Version_# field indicating a version number of a given packet, and a Redundancy_Type field indicating a redundancy type in a given version. Of course, the HARQ message field can be arranged at either the head or the tail of the dedicated control TrCH, as shown in FIGS. 3A and 3B. The number of bits assigned to the respective fields is determined according to the HARQ type and its restrictions. That is, the bit number can be determined depending on the maximum allowable transmission delay and the memory requirement at the receiver. Table 2 below shows an example of bit assignments for the HARQ message field.

TABLE 2

| Message Field | Bits |
| --- | --- |
| Reserved | 0–4 |
| NACK/ACK | 1 |
| Frame # | 4 |
| Version # | 2 |
| Redundancy Type | 2 |

In addition, the control message for HARQ generally requires a fast response. To this end, the dedicated control TrCH transmitting the control message must be received at the receiver together with a dedicated traffic TrCH transmitting a data block. Therefore, the dedicated control TrCH should use TTI (Transport Time Interval), which is equal to or less than that of the dedicated traffic TrCH for HARQ. It is preferable to use 10 msec TTI in transmitting the HARQ control message through the dedicated control TrCH, if the identical TTI is used.

Message Channel Transmission Applied to 3GPP Standard (Dedicated Control TrCH Used)

Next, a description will be made regarding a method for efficiently transmitting a message transmission channel in the 3GPP standard to which HARQ is applied. That is, a method for increasing transmission reliability of the message transport channel by using a rate matching technique used in the 3GPP standard will be described.

In general, a data block transport channel has a much higher data rate compared with a message transport channel. For example, the message transport channel transmits a maximum of several tens of control message bits per TTI. That is, if the message transport channel transmits 20 control message bits per 10 msec TTI, the data rate becomes 2 Kbps. However, the data block transport channel has a data rate of from several tens of Kbps to several hundreds of Kbps. In this state, by performing symbol puncturing, using rate matching (RM), on n bits from TrCH used for the data block transport channel and assigning them to TrCH used for the message transport channel, it is possible to drastically increase the reliability of the message transport channel by symbol repetition.

Figure 4:
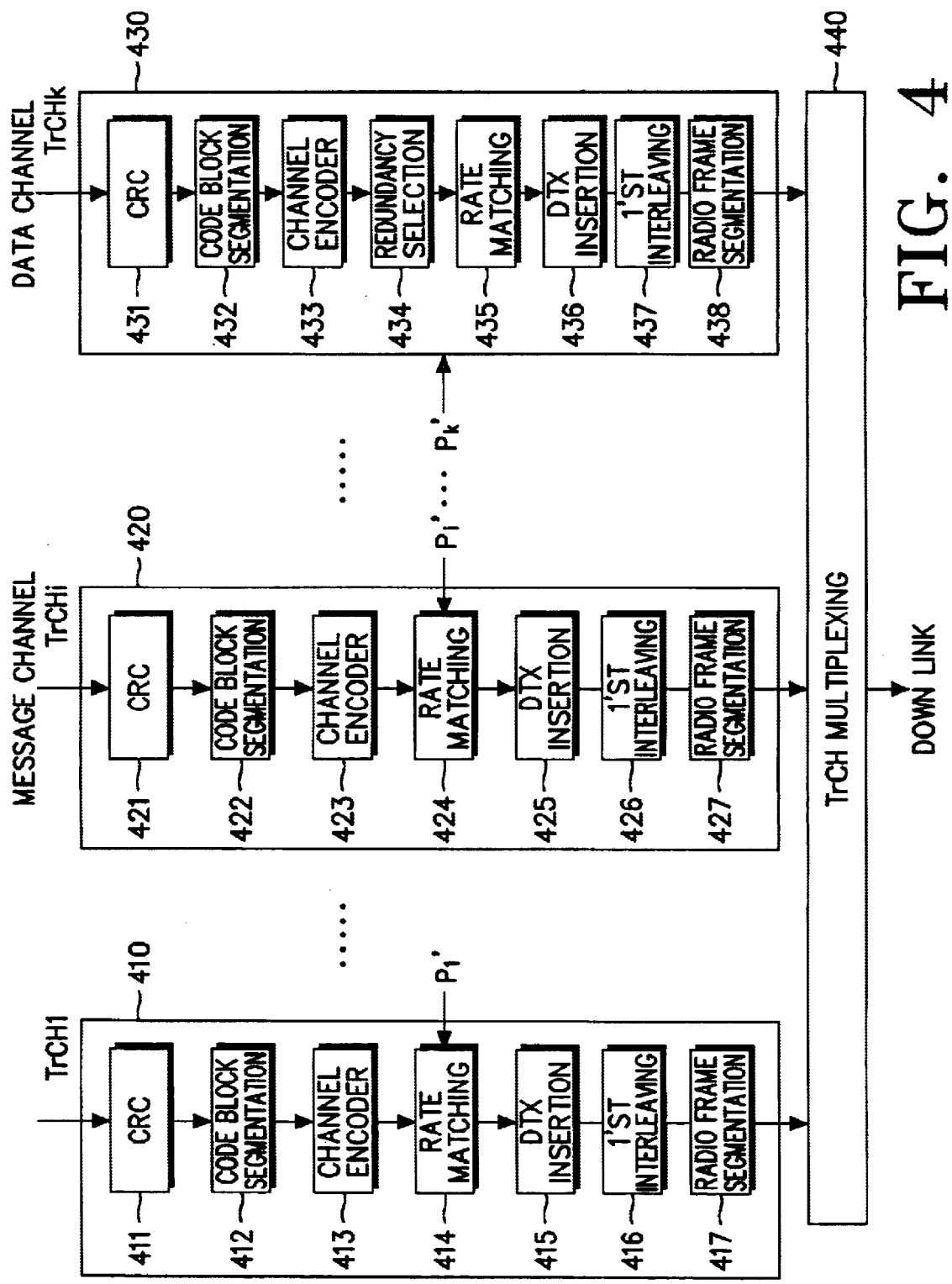
FIG. 4 is a block diagram illustrating a structure of a transport channel included in a transmitter in a downlink according to an embodiment of the present invention.
Figure 5:
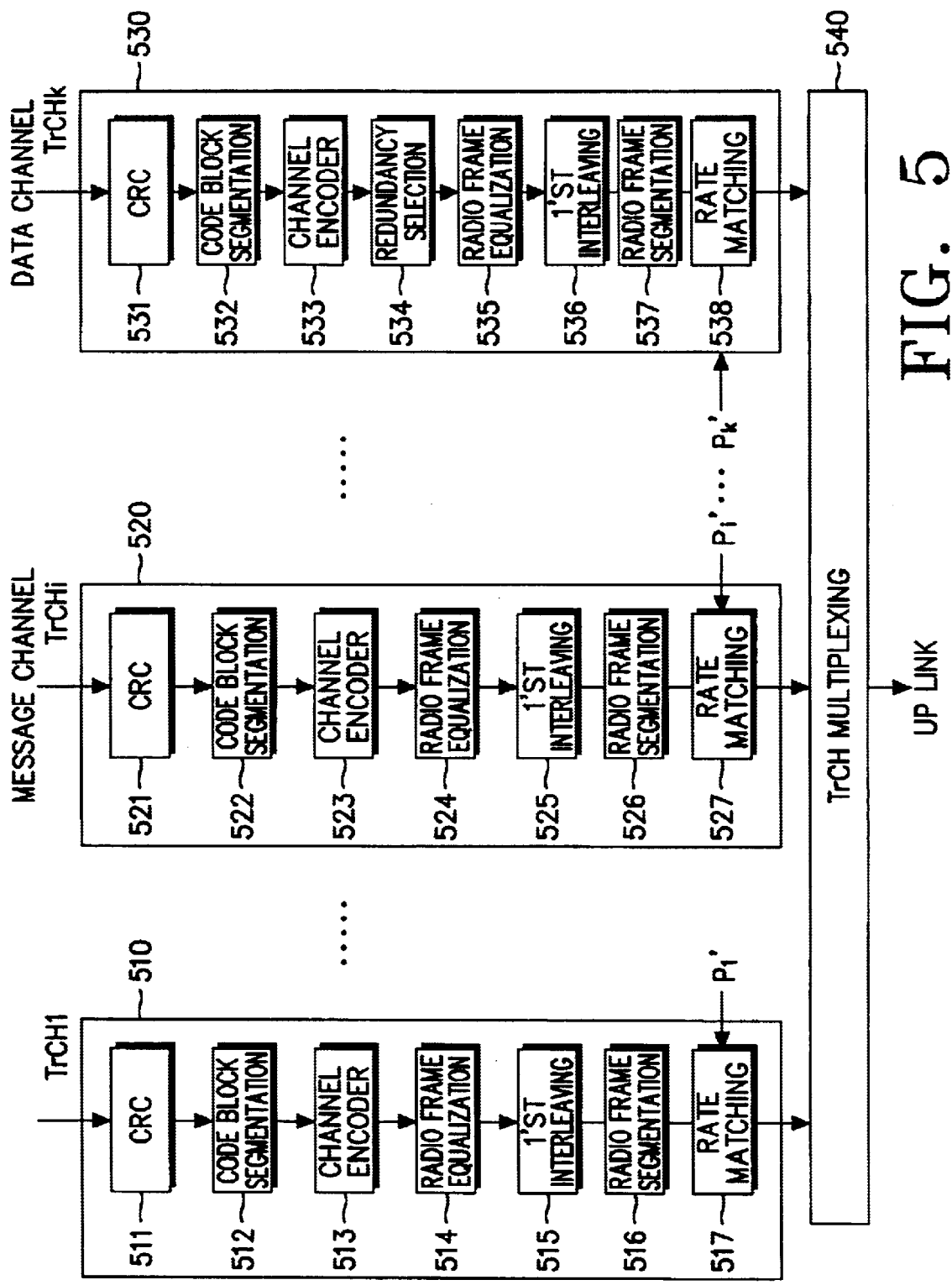
FIG. 5 is a block diagram illustrating a structure a transport channel included in a transmitter in an uplink according to an embodiment of the present invention.

FIGS. 4 and 5 illustrate structures of the transport channels in the transmitter, for puncturing specific bits from the data block transport channel and assigning data bits to the message transport channel for as many as the number of the punctured bits.

More specifically, FIG. 4 illustrates a structure of the transport channel included in the transmitter for a downlink according to an embodiment of the present invention, and FIG. 5 illustrates a structure of the transport channel included in the transmitter for an uplink according to an embodiment of the present invention.

In FIGS. 4 and 5, two shaded blocks indicate transport channels used during HARQ. That is, the shaded blocks 420, 430, 520, 530 indicate a data block transport channel for HARQ and a message transport channel for transmitting a control message used in association with the data block transport channel. Meanwhile, by applying the present invention to the existing data transport channel and message transport channel, it is possible to differentiate a rate matching part of the data transport channel and a rate matching part of the message transport channel, from those of the prior art.

The transport channel structure of the transmitter according to the present invention will be described assuming that one of the transport channels TrCHs shown in FIGS. 4 and 5 is used as a message transport channel 420 and 520, while the other transport channels are used as data block transport channels 430 and 530.

First, the structure of the message transport channel among the transport channels of the transmitter for the downlink according to an embodiment of the present invention will be described with reference to FIG. 4. A CRC inserter 421 receives a control message block comprised of control bits and adds a CRC to the received control message block. That is, the CRC inserter 421 refers to a CRC encoder used in the transmitter to detect whether an error has occurred in the control message block. A code block segmentation part 422 performs block segmentation on the CRC-added control message block. The code block segmentation can be omitted in this invention. A channel encoder 423 encodes the CRC added control message block with a predetermined channel code, for which convolutional codes or turbo codes can be used which can correct errors generated in the channel transmission process as mentioned above. A rate matching part 424 receives the coded control message block and repeats/puncture a specific number of data bits of the coded control message block. The specific number of data bits is determined by the number of the data bits to be transmitted by the data block transport channel 430. A scheme for repeating/puncturing the specific number of data bits from the data block will be described hereinbelow. A DTX inserter 425 inserts DTX (Discontinuous Transmission) bit in the rate matched-control message block (i.e., temporarily discontinuing transmission of the rate matched-control message block), and an interleaver 426 interleaves the DTX-inserted control message block. A radio frame segmentation block 427 segments the interleaved control message block into radio frames.

For reference, the CRC blocks 411, 421, and 431 shown in FIG. 4 refer to CRC encoders used in the transmitter to detect whether errors have occurred in the data block. Meanwhile, a tail bit insertion block (not shown) inserts termination bits used for zero state termination necessary for the convolutional codes or the turbo codes, used for the channel encoders 413, 423 and 433. Next, the channel encoders 413, 423 and 433 refer to encoders for the convolutional codes or the turbo codes, used when the receiver corrects the errors that have occurred in the channel transmission process, as described above.

Next, the structure of the data block transport channel among the transport channels of the transmitter for the downlink according to an embodiment of the present invention will be described with reference to FIG. 4. The CRC inserter 431 receives a data block with an associated message number from an upper layer and adds a CRC to the received data in a predetermined way. That is, the CRC inserter 431 refers to a CRC encoder used in the transmitter to detect whether an error has occurred in the data block. A code block segmentation part 432 performs block segmentation on the CRC-added data block. A channel encoder 433 encodes the block segmented-data block from the block segmentation part 432 with a predetermined channel code, and provides the coded data block to a redundancy selector 434. For the channel code, the convolutional codes or the turbo codes can be used which can correct errors that have occurred in the channel transmission process as mentioned above. The redundancy selector 434 selects redundancies according to first transmission, second transmission and third transmission based on a selection criterion (or selection rule) of a transmission apparatus and method of the HARQ data communication system, and provides the selected redundancies to a rate matching part 435. The rate matching part 435 repeats/punctures a predetermined number of data bits from the data block provided from the redundancy selector 434, and provides its output data block to a DTX inserter 436. The DTX inserter 436 inserts DTX bit in the rate matched-data block, and an interleaver 437 interleaves the DTX-inserted data block. A radio frame segmentation block 438 segments the interleaved data block into radio frames.

Meanwhile, a multiplexer 440 multiplexes the data blocks output from the respective transport channels before transmission. Though not shown in FIG. 4, a tail bit insertion block inserts termination bits used for zero state termination necessary for the convolutional codes or the turbo codes, used for the channel encoders 413, 423 and 433.

In the embodiment of the present invention described with reference to FIG. 4, the rate matching part 424 of the message transport channel 420 repeats data bits of the message transport channel 420 in place of the data bits punctured during rate matching of the data block transport channel 430, thereby making it possible to use the message transport channel 420 more stably.

The structure of the transport channel of the transmitter for the uplink according to an embodiment of the present invention, shown in FIG. 5, replaces the DTX inserters 415, 425 and 436 in the transport channel structure of FIG. 4 with equalizers 514, 524 and 535, respectively. In addition, FIG. 5 shows a structure of the transport channel in which rate matching is performed by rate matching parts 517, 527 and 538 after radio frame segmentation at segmentation blocks 516, 526 and 537, respectively. As the other elements of FIG. 5 have the same operation as that of the corresponding ones of FIG. 4, a detailed description will not be provided.

Now, a detailed description will be made regarding an operation of puncturing a predetermined number of data bits from the data block and repeating a predetermined number of data bits of the control message according to an embodiment of the present invention.

As shown in FIGS. 4 and 5, TrCHi is defined as TrCH assigned for a message transport channel, and a size of the message block transmitted thereby is defined as Ni. Further, TrCHk is defined as TrCH assigned for transmission of a data block, and a size of the data block transmitted thereby is defined as Nk. In addition, rate matching (RM) parameters determined for TrCHi and TrCHk by an upper service determining layer at a QoS request are defined as Pi and Pk, respectively. Next, rate matching parameters finally determined when n bits are separated from TrCHk and then moved to TrCHi are defined as Pi' and Pk', respectively. Then, the relationship among the parameters can be represented by the following equations.

$$(Pi, Ni) \rightarrow (Pi', Ni') \quad (1)$$

$$(Pk, Nk) \rightarrow (Pk', Nk') \quad (2)$$

$$(Nk(1-Pk)-n)/Nk = 1-Pk' \quad (3)$$

$$(Ni(1-Pi)+n)/Ni = 1-Pi' \quad (4)$$

If it is assumed that Nk>>n and Nk>>Ni, the Equations (3) and (4) can be rewritten as Equations (5) and (6), respectively.

$$(Nk(1-Pk)-n)/Nk = 1-Pk' = (1-Pk)-n/Nk \approx 1-Pk \quad (5)$$

$$(Ni(1-Pi)+n)/Ni = 1-Pi' = (1-Pi)+n/Ni >> 1.0 \quad (6)$$

Therefore, even though the n bits are deleted, TrCHk undergoes minute variation n/Nk(<<1.0) which causes little performance variation at the initially set RM parameter Pk. However, TrCHi can increase an RM parameter value by n/Ni by the addition of n bits, and is subject to symbol repetition for which a substantial RM parameter is larger than 1.0. Such relationships are represented by connecting Pk' and Pk'with a dotted line in FIGS. 4 and 5. Therefore, when the rate matching part 424 of TrCH uses doubled symbol repetition, the symbol energy increases by about +3 dB, thereby drastically increasing reliability of the message channel TrCHi.

Figure 6:
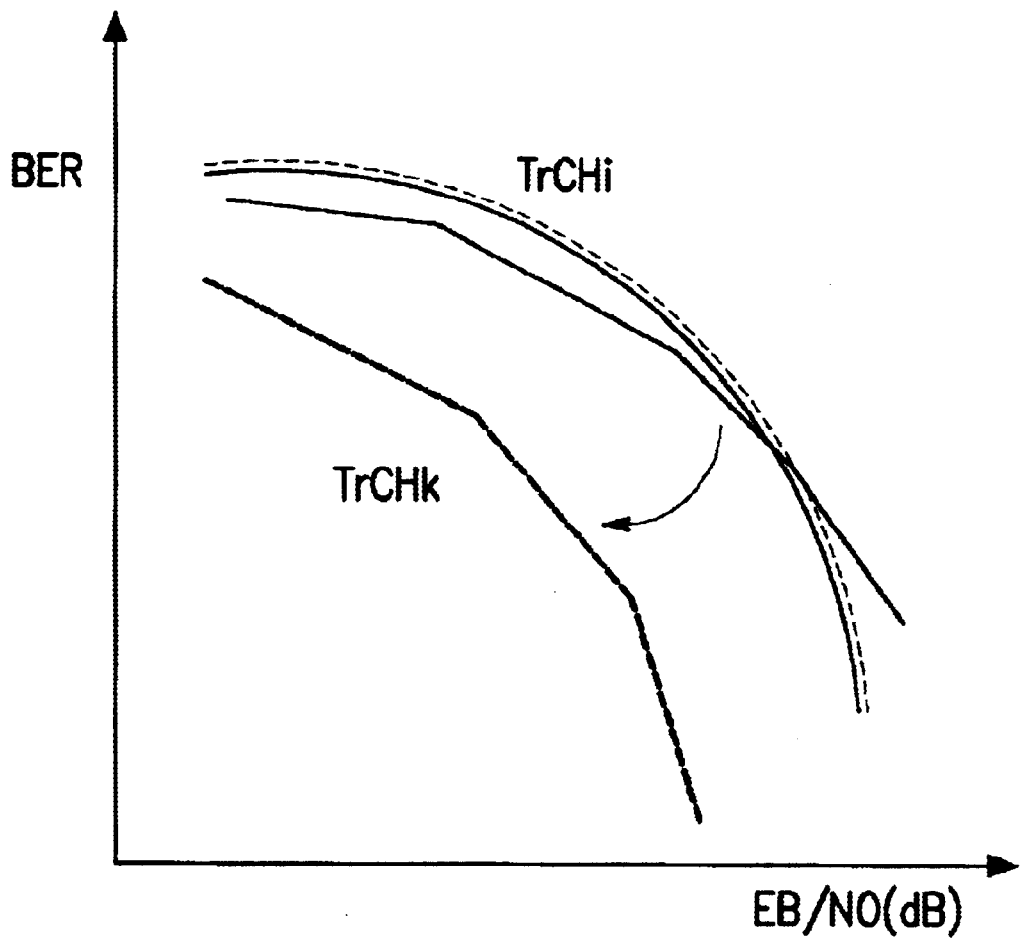
FIG. 6 is a graph showing improvements on performance of the transport channels according to an embodiment of the present invention.

Such performance variation is shown in FIG. 6, wherein solid lines indicate bit error rates (BERs) of TrCHi and TrCHk to which the present invention is not applied, while dotted lines indicate BERs of TrCHi and TrCHk to which the present invention is applied. Application of the present invention is determined depending on whether TrCHk is subjected to puncturing and TrCHi is subjected to repetition. As shown in FIG. 6, when the present invention is applied, TrCHk experiences little performance deterioration, whereas TrCHi shows remarkable performance improvement.

As described above, the present invention provides an HARQ scheme for increasing a response speed of the message channel in consideration of the conditions necessary to provide for the most effective message channel. Therefore, the present invention can increase reliability of the data communication system and improve throughput, thereby improving performance of future mobile communication systems as well as data communication systems.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for transmitting a data block having a sequence of data bits and a control message having control bits required for decoding the sequence of data bits, comprising the steps of:

puncturing a predetermined number of data bits of the data bits within the data block using a puncturer in a first transport channel for passing the data block;

repeating a control message within the control message using a repeater in a second transport channel based on the predetermined number of punctured bits;

multiplexing the punctured data block and repeated control message; and transmitting the multiplexed bit to a receiver.

2. The method as claimed in claim 1, wherein the second transport channel includes the control message arranged at the head thereof.

3. The method as claimed in claim 1, wherein the second transport channel includes the control channel message arranged at the tail thereof.

4. The method as claimed in claim 1, wherein the control message is a message responding to a received data block.

5. The method as claimed in claim 1, wherein the control message includes a serial number of a transmission data block, a version number of a given data block.

6. The method as claimed in claim 1, wherein the second transport channel has a transmission delay time equal to that of the first transport channel.

7. The method as claimed in claim 1, wherein the second transport channel has a transmission delay time less than that of the first transport channel.

8. An apparatus provided with a plurality of transport channels, for transmitting a data block having a sequence of data bits and a control message having control bits required for decoding the sequence of data bits, the apparatus comprising:

- a first rate matching part provided in a selected transport channel, passing the data block, for puncturing a predetermined number of data bits of the data bits within the data block;
- a second rate matching part provided in another transport channel, for repeating the control bits according to the predetermined number of punctured bits; and
- a multiplexer for multiplexing the output of the first rate maching part and the output of the second rate maching part.

9. The method as claimed in claim 8, wherein the second transport channel includes the control message arranged at the head thereof.

10. The method as claimed in claim 8, wherein the second transport channel includes the control message arranged at the tail thereof.

11. The method as claimed in claim 8, wherein the control message is a message responding to a received data block.

12. The method as claimed in claim 8, wherein the control message includes a serial number of a transmission data block, a version number of a given data block.

13. The method as claimed in claim 8, wherein the second transport channel has a transmission delay time equal to that of the first transport channel.

14. The method as claimed in claim 8, wherein the second transport channel has a transmission delay time less than that of the first transport channel.

* * * * *